United States Patent [19]
Hitz et al.

[11] Patent Number: 5,948,110
[45] Date of Patent: Sep. 7, 1999

[54] METHOD FOR PROVIDING PARITY IN A RAID SUB-SYSTEM USING NON-VOLATILE MEMORY

[75] Inventors: David Hitz, Sunnyvale; Michael Malcolm, Los Altos; James Lau, Cupertino; Byron Rakitzis, Mountain View, all of Calif.

[73] Assignee: Network Appliance, Inc., Santa Clara, Calif.

[21] Appl. No.: 08/471,218

[22] Filed: Jun. 5, 1995

Related U.S. Application Data

[63] Continuation of application No. 08/071,798, Jun. 4, 1993, abandoned.

[51] Int. Cl.[6] .................................................. G06F 11/00
[52] U.S. Cl. ............................ 714/6; 714/710; 714/711; 711/114
[58] Field of Search .................... 395/182.04, 182.03, 395/182.05, 182.06, 182.09, 182.1; 371/2.2, 10.2, 10.3, 21.1, 40.11, 40.12, 40.13; 711/114, 118

[56] References Cited

U.S. PATENT DOCUMENTS

| | | | |
|---|---|---|---|
| 4,075,691 | 2/1978 | Davis et al. | 364/200 |
| 4,156,907 | 5/1979 | Rawlings et al. | 364/200 |
| 4,333,144 | 6/1982 | Whiteside et al. | 364/200 |
| 4,377,843 | 3/1983 | Garringer et al. | 364/200 |
| 4,399,503 | 8/1983 | Hawley | 364/200 |
| 4,456,957 | 6/1984 | Schieltz | 364/200 |
| 4,459,664 | 7/1984 | Pottier et al. | 364/200 |
| 4,488,231 | 12/1984 | Burlington et al. | 364/200 |
| 4,527,232 | 7/1985 | Bechtolsheim | 364/200 |
| 4,550,368 | 10/1985 | Bechtolsheim | 364/200 |

(List continued on next page.)

FOREIGN PATENT DOCUMENTS

| | | | |
|---|---|---|---|
| 0 321 723 | 6/1989 | European Pat. Off. | G06F 15/16 |
| 552580 | 7/1993 | European Pat. Off. | |
| 0 497 067 | 8/1993 | European Pat. Off. | |
| 0 569 313 | 1/1994 | European Pat. Off. | |
| 629956 A2 | 12/1994 | European Pat. Off. | |

(List continued on next page.)

OTHER PUBLICATIONS

IBM Technical Disclosure Bulletin, vol. 36, No. 03, Mar. 1993, "Parity Preservation for Redundant Array of Independent Direct Access Storage Device Data Loss Minimization and Repair".

Sun Microsystems, Inc., Sun OS 5.0 Network Interfaces Programmer's Guide, p. 108, Jun. 1992.

Chutani, Sailesh, et al., "The Episode File System", USENIX Winter Conference, Jan. 30–24, 1992.

Sun Microsystems, "Network Programming Guide", Chapter 4, "Remote Procedure Call Programming Guide", Revision A of Mar. 27, 1990, pp. 65–128.

(List continued on next page.)

*Primary Examiner*—Dieu-Minh T. Le
*Attorney, Agent, or Firm*—Swernofsky Law Group

[57] ABSTRACT

A method is disclosed for providing error correction for an array of disks using non-volatile random access memory (NV-RAM). Non-volatile RAM is used to increase the speed of RAID recovery from a disk error(s). This is accomplished by keeping a list of all disk blocks for which the parity is possibly inconsistent. Such a list of disk blocks is much smaller than the total number of parity blocks in the RAID subsystem. The total number of parity blocks in the RAID subsystem is typically in the range of hundreds of thousands of parity blocks. Knowledge of the number of parity blocks that are possibly inconsistent makes it possible to fix only those few blocks, identified in the list, in a significantly smaller amount of time than is possible in the prior art. The technique for safely writing to a RAID array with a broken disk is complicated. In this technique, data that can become corrupted is copied into NV-RAM before the potentially corrupting operation is performed.

5 Claims, 8 Drawing Sheets

U.S. PATENT DOCUMENTS

| | | | |
|---|---|---|---|
| 4,685,125 | 8/1987 | Zave | 364/200 |
| 4,710,868 | 12/1987 | Cocke et al. | 364/200 |
| 4,719,569 | 1/1988 | Ludemann et al. | 364/200 |
| 4,742,447 | 5/1988 | Duvall et al. | 364/200 |
| 4,761,785 | 8/1988 | Clark | 371/51.1 X |
| 4,766,534 | 8/1988 | DeBenedictis | 364/200 |
| 4,780,821 | 10/1988 | Crossley | 364/200 |
| 4,783,730 | 11/1988 | Fischer | 364/200 |
| 4,803,621 | 2/1989 | Kelly | 364/200 |
| 4,819,159 | 4/1989 | Shipley et al. | 364/200 |
| 4,825,354 | 4/1989 | Agrawal et al. | 364/200 |
| 4,887,204 | 12/1989 | Johnson et al. | 364/200 |
| 4,897,781 | 1/1990 | Chang et al. | 364/200 |
| 4,914,583 | 4/1990 | Weisshaar et al. | 364/200 |
| 5,134,619 | 7/1992 | Henson | 371/40.1 |
| 5,146,588 | 9/1992 | Crater et al. | 395/182.04 |
| 5,155,835 | 10/1992 | Belsan | 395/425 |
| 5,163,131 | 11/1992 | Row et al. | 395/200 |
| 5,195,100 | 3/1993 | Katz | 371/10.1 |
| 5,208,813 | 5/1993 | Stallmo | 371/10.1 |
| 5,218,695 | 6/1993 | Noveck et al. | 395/600 |
| 5,218,696 | 6/1993 | Baird et al. | 395/600 |
| 5,235,601 | 8/1993 | Stallmo | 395/575 |
| 5,255,270 | 10/1993 | Yanai | 371/10.2 |
| 5,274,799 | 12/1993 | Brant | 371/10.1 X |
| 5,274,807 | 12/1993 | Hoshen et al. | 395/650 |
| 5,276,840 | 1/1994 | Yu | 395/425 |
| 5,276,867 | 1/1994 | Kenley et al. | 395/600 |
| 5,305,326 | 4/1994 | Solomon | 371/51.1 X |
| 5,313,626 | 5/1994 | Jones | 395/575 |
| 5,315,602 | 5/1994 | Noya | 371/10.1 X |
| 5,333,305 | 7/1994 | Neufeld | 395/182.03 |
| 5,335,235 | 8/1994 | Arnott | 371/49.2 |
| 5,355,453 | 10/1994 | Row et al. | 395/200.49 |
| 5,357,509 | 10/1994 | Ohizumi | 371/10.1 |
| 5,379,417 | 1/1995 | Lui | 395/575 |
| 5,490,248 | 2/1996 | Dan et al. | 395/182.04 |
| 5,502,836 | 3/1996 | Hale et al. | 711/170 |
| 5,519,844 | 5/1996 | Stallmo | 711/114 |
| 5,675,726 | 10/1997 | Hohenstein et al. | 395/182.04 |
| 5,737,744 | 4/1998 | Callison et al. | 711/114 |
| 5,742,752 | 4/1998 | DeKoning | 395/182.04 |

FOREIGN PATENT DOCUMENTS

| | | | |
|---|---|---|---|
| 629956 A3 | 12/1994 | European Pat. Off. . | |
| 747829 | 12/1996 | European Pat. Off. . | |
| 0 462 917 | 1/1997 | European Pat. Off. . | |
| 756235 | 1/1997 | European Pat. Off. . | |
| WO 89/03086 | 4/1989 | WIPO | G06F 9/46 |
| WO 9113404 | 9/1991 | WIPO . | |
| WO 9313475 | 7/1993 | WIPO . | |
| WO 9821656 | 5/1998 | WIPO . | |

OTHER PUBLICATIONS

R. Nass: Connect Disk Arrays to Eisa or PCI Buses Electronic Design, vol. 41, No. 23, Nov. 1993, Cleveland, OH, USA pp. 152–154, XP000417908 see p. 152 –p. 153, right–hand column, line 10.

IBM Technical Disclosure Bulletin, vol. 36, No. 03, Mar 1993, "Parity Preservation for Redundant Array of Independent Direct Access Storage Device Data Loss Minimization and Repair".

Osadzinski, Alex, "The Network File System (NFS)", 8202 Computer Standards & Interfaces, 8 (1988/89) No. 1, pp. 45–48, Amsterdam, The Netherlands.

Tannebaum, Andrew S., "Computer Networks"(1988), 2nd Edition, Prentice Hall, pp. 35, 36, Chap. 9.

IEEE Computer, "I/O subsystem", Sep. 1988, pp. 23–25 and 106.

Carlson, et al., "HP AdvanceNet: A Growth–Oriented Computer Networking Architectural Strategy", Hewlett–Packard Journal (Oct. 1986), p. 2, pp. 6–10.

Tribby, David M., "Network Services for HP Real–Time Computers", Hewlett–Packard Journal (Oct. 1986), pp. 22–27.

Motorola, Inc., Microsystems Products Technical Data Sheet (1986), micoMAP1–7, "MicroMAP MAnufacturing Automation Protocol Software".

Bach, *The Design of the Unix Operating System*, Prentice–Hall, 1986, pp. 38–90 and 325–329.

Beach, Richard J., et al., The Message is the Medium: Multiprocess Structuring of an Interactive Paint Program, Computer Graphics, vol. 16, No. 3, Jul. 1982, pp. 277–287.

Britton, Dianne E., et al., An Interprocess Communication Facility for Distributed Applications, RCA Laboratiroes, David Sarnoff Research Centr, Princeton, NJ© 1980 IEEE.

Carr, Robert, et al., The Power of PenPoint, Ch 5: The Class Manager,© 1991 Addison Wesley.

Cashin, *Inter Process Communication*, Bell–Northern Research, Document No. 8005014, 1980.

Chao, Chia, et al., Mime: a high performance storage device with strong recovery guarantees, Hewlett–Packard Company, Mar. 18, 1992.

Cheriton, David R. The Thoth System: Multiprocess Structuring and Portability, Ch 2: Thoth Program Environment, and Ch 3: Thoth Kernel Design,© 1982 North–Holland.

Cohen, Jacques, Garbarge Collection of Linked Data Structures, Department of Physics, Brandeis University, Waltham, MA Computing Surveys, vol. 13, No. 3, Sep. 1981,© 1981.

Deitel, An Introduction to Operating Systems, Addison Wesley, 1984, pp. 302–334.

de Jonge, Wiebren, et al., The Logical Disk: A New Approach to Improving File Systems.

English, Robert M. et al., *Loge: A Self–Organizing Disk Controller*, Software and Systems Laboratory,© 1991 Hewlett Packard.

*File Systems*, Chapter 5, pp. 251–273.

Hammond, Richard A. Experiences with the Series/1Distributed System, Department of Electrical Engineering, U of Delaware, Newark, Delaware,© 1980 IEEE.

Hanson, Per Brinch (editor), brochure: *RC 400 Software Multiprogramming System*, Ch 4: Process Communication, A/s Regnecentralen, Copenhagen—Apr. 1969.

Hartman, John H., et al., The Zebra Striped Network File System.

Hitz, David, Technical Report TR01: An NFS File Server Appliance, Network Appliance Corporation.

Hitz, Dave et al., Technical Report 3002: File System Design for an NFS File Server Appliance, Network Appliance, Jan. 19, 1994.

Hitz, David, et al., Using Unix as One Component of a Lightweight Distributed Kernel for Multiporcessor File Servers, Auspex Technical Report 5,© 1990 Auspex Systems Inc.

Jones, Anita K., et al., StarOS, a Multiprocessor Operating System for the Support of Task Forces, Association for Computing Machinery, 1979, pp. 117–127.

Lantz, Keith A., et al., Rochester's Intelligent Gateway, Computer© 1982 IEEE.

Leffler, et al., The Design and Implementation of the 4.3BSD UNIX Operating System, Addison–Wesley, 1989, pp. 187–245.

Ousterhout, John, et al., Beating the I/O Bottleneck: A Case for Log–Structured File Systems, Oct. 30, 1988.

Patterson, David A., et al., A Case for Redundant Arrays of Inexpensive Disks (RAID), UC Berkeley.

Plum, Thomas, Reliable Data Structures in C, section 4.9: Pointers to Functions,© 1985 Plum Hall, Inc., pp. 4–23 to 4–27.

Rashid, Richard F. et al., Accent: A communication oriented network operating system kernel, Department of Computer Science, Carnegie–Mellon University, Pittsburgh, PA© 981.

Ritchie, D.M. The UNIX System: A Stream Input–Output System, AT&T Bell Laboratories Technical Journal, Oct. 1984, vol. 63, No. 8 Part 2,© 1984 AT&T.

Robertazzi, Thomas G., Computer Networks and Systems: Queuing Theory and Performance Evaluation, Ch 1: The Queuing Paradigm,© 1990 Springer–Verlag.

Row, John, Lan Software Links Diverse Machines, OS's, Mini–Micro Systems, Sep. 1965, pp. 141–146.

Row, John, et al., Operating System Extensions Link Disparate Systems, Computer Design, Jul. 1984, pp. 171–183.

Schwartz, Allan M., et al., LFS—A Local File System for Multiprocessor NFS Network Servers, Auspex Technical Report 4,© 1989 Auspex Systems, Inc.

Seltzer, Margo, et al., An Implementation of a Log–Structured File System for UNIX, 1993 Winter UNSENIX, San Diego, CA.

Seltzer, Margo, *File System Performance and Transaction Support*, 1992.

Sessions, Roger, Class Construction in C and C++ Object Oriented Programming Fundamentals, International Business Machines Corporation, section 4.4: Object Method Inflexibility,© 1992 Prentice Hall, NJ.

Silberschatz, Abraham, et al., *Operating Concepts*, Ch 3.7: Interprocess Communication, pp. 127–147,© 1988 Addison–Wesley Publishing Company, Inc.

Sincoskie, W. David, et al., The Series/1 Distributed Operating System: Description and Comments, IEEE, 1980, pp. 579–584.

Stern, Hal, Managing NFS and NIS, NFS Daemons,© 1991 O'Reilly & Associates, Inc.

Tanenbaum, Andrew S., *Operating Systems Design and Implementation*, pp. 251–273.

Tweten, David, Hiding Mass Storage Under Unix: NASA's MSS II Architecture, IEEE, 1990, pp. 140–145.

Unix System Laboratories, Inc., *Unix System V Release 4 Programmer's Guide: Streams*, section 2: What is STREAMS?, AT&T Unix System Laboratories, Inc., Unix System V Release 4 Programmer's Guide: STREAMS. 1990 Prentice Hall.

UNIX International, UI–Atlas Distributed Computing Architecture: A Technical Overview, Oct. 1991.

*VRTX32/68020 Versatile Real–Time Executive for the MC68020 Microprocessor: User's Guide*, Software Release 1, Document No. 541331001, Apr. 1987.

*VRTX Versatile Real–Time Executive for Microprocessors C: User's Guide*, Software Release 3, Document No. 592103003, Jan. 1987.

Walton, Robert L., Rational for a Queueable Object Distributed Interprocess Communication System, IEEE Transactions on Communications, vol. Com–30, No. 6, Jun. 1982, pp. 1417–1425.

Wood, B.J., et al., A Local–Area Network Architecture Based on Message–Passing Operating System Concepts, 7th Conference on Local Computer Networks, Miniapolis, MN, Oct. 1932.

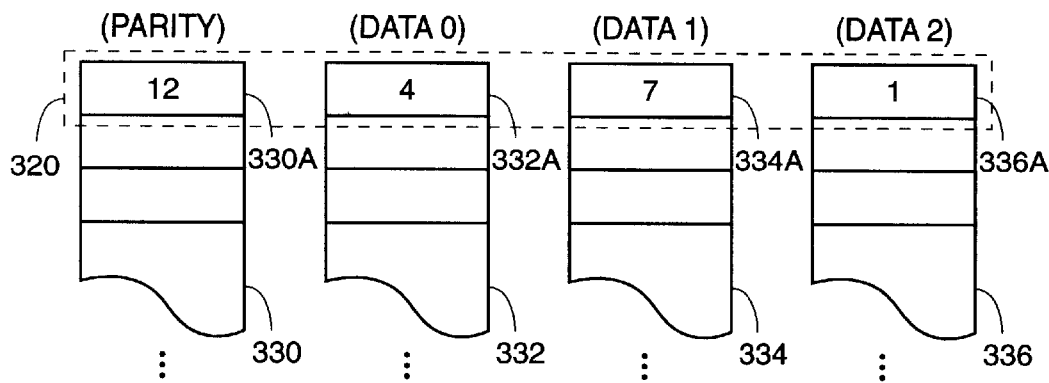
FIG. 3A
(PRIOR ART)
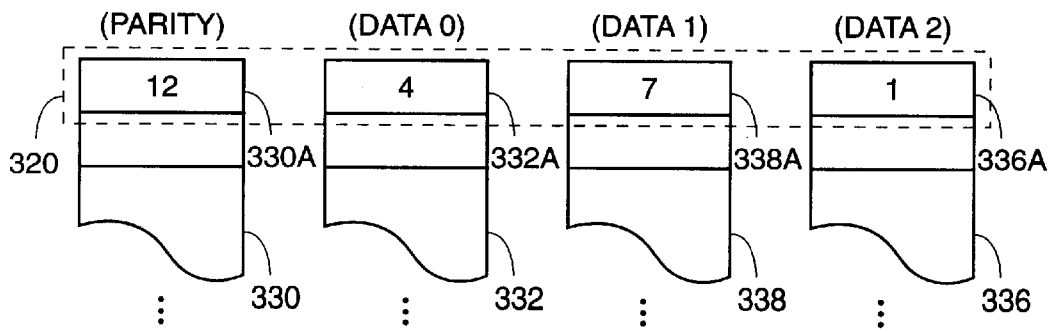
FIG. 3B
(PRIOR ART)
FIG. 3C
(PRIOR ART)

|   | PARITY | DATA 0 | DATA 1 | DATA2 | NV |
|---|--------|--------|--------|-------|-----|
| $t_A$ | 12 | 4 | (7) | 1 | ? |
| $t_B$ | 12 | 4 | (7) | 1 | [7] |
| $t_C$ | 12 | [2] | (9) | 1 | 7 |
| $t_D$ | [10] | 2 | (7) | 1 | 7 |
| $t_E$ | 10 | 2 | (7) | 1 | [?] |

SYSTEM FAILURE → (at $t_C$)

TIME

|   | PARITY | DATA 0 | DATA 1 | DATA2 | NV |
|---|--------|--------|--------|-------|-----|
| $t_A$ | 12 | 4 | (7) | 1 | ? |
| $t_B$ | 12 | 4 | (7) | 1 | [7] |
| $t_C$ | [10] | 4 | (5) | 1 | 7 |
| $t_D$ | [12] | 4 | (7) | 1 | 7 |
| $t_E$ | 12 | 4 | (7) | 1 | [?] |

SYSTEM FAILURE → (at $t_C$)

TIME

FIG. 9

| | | PARITY | DATA 0 | DATA 1 | DATA2 |
|---|---|---|---|---|---|
| SYSTEM FAILURE | 0 | | | | |
| | $t_A$ | 12 | 4 | 7 | 1 |
| | $t_B$ | 12 | [2] | 7 | 1 |
| | $t_C$ | 12 | 2 | (9) | 1 |
| | TIME | | | | |

FIG. 10A

| | | PARITY | DATA 0 | DATA 1 | DATA2 | NV-RAM PARITY | NV-RAM DATA 0 |
|---|---|---|---|---|---|---|---|
| | 0 | | | | | | |
| SYSTEM FAILURE | $t_A$ | 12 | 4 | 7 | 1 | ? | ? |
| | $t_B$ | 12 | 4 | 7 | 1 | 12 | 4 |
| | $t_C$ | 12 | [2] | 7 | 1 | 12 | 4 |
| | $t_D$ | ([10]) | 2 | 7 | 1 | 12 | 4 |
| | $t_E$ | (10) | 2 | 7 | 1 | ? | ? |
| | TIME | | | | | | |

FIG. 10B

| | | PARITY | DATA 0 | DATA 1 | DATA2 | NV-RAM PARITY | NV-RAM DATA 0 |
|---|---|---|---|---|---|---|---|
| | 0 | | | | | | |
| SYSTEM FAILURE | $t_A$ | 12 | 4 | 7 | 1 | ? | ? |
| | $t_B$ | 12 | 4 | 7 | 1 | 12 | 4 |
| | $t_C$ | 12 | [2] | 7 | 1 | 12 | 4 |
| | $t_D$ | [12] | ([4]) | 7 | 1 | 12 | 4 |
| | $t_E$ | 12 | 4 | 7 | 1 | ? | ? |
| | TIME | | | | | | |

FIG. 10C

| | | PARITY | DATA 0 | DATA 1 | DATA2 | NV-RAM PARITY | NV-RAM DATA 0 |
|---|---|---|---|---|---|---|---|
| | 0 | | | | | | |
| SYSTEM FAILURE | $t_A$ | 12 | 4 | 7 | 1 | ? | ? |
| | $t_B$ | 12 | 4 | 7 | 1 | 12 | 4 |
| | $t_C$ | 12 | [2] | 7 | 1 | 12 | 4 |
| | $t_D$ | [12] | [4] | ([7]) | 1 | 12 | 4 |
| | $t_E$ | 12 | 4 | (7) | 1 | ? | ? |
| | TIME | | | | | | |

|  | PARITY | DATA 0 | DATA 1 | DATA2 | NV-RAM DATA 1 | DATA 2 |
|---|---|---|---|---|---|---|
| 0 | | | | | | |
| $t_A$ | 12 | 4 | 7 | 1 | ? | ? |
| $t_B$ | 12 | 4 | 7 | 1 | [7] | [1] |
| $t_C$ | 12 | [2] | 7 | 1 | 7 | 1 |
| *** | | | | | | |
| $t_D$ | (10) | 2 | 7 | 1 | 7 | 1 |
| $t_E$ | (10) | 2 | 7 | 1 | [?] | [?] |

TIME

*FIG. 12A*

|  | PARITY | DATA 0 | DATA 1 | DATA2 | NV-RAM DATA 1 | DATA 2 |
|---|---|---|---|---|---|---|
| 0 | | | | | | |
| $t_A$ | 12 | 4 | 7 | 1 | ? | ? |
| $t_B$ | 12 | 4 | 7 | 1 | [7] | [1] |
| $t_C$ | 12 | [2] | 7 | 1 | 7 | 1 |
| *** | | | | | | |
| $t_D$ | 12 | (4) | 7 | 1 | 7 | 1 |
| $t_E$ | [8] | (0) | 7 | 1 | 7 | 1 |
| $t_F$ | 8 | (0) | 7 | 1 | [?] | [?] |

TIME

*FIG. 12B*

|  | PARITY | DATA 0 | DATA 1 | DATA2 | NV-RAM DATA 1 | DATA 2 |
|---|---|---|---|---|---|---|
| 0 | | | | | | |
| $t_A$ | 12 | 4 | 7 | 1 | ? | ? |
| $t_B$ | 12 | 4 | 7 | 1 | [7] | [1] |
| $t_C$ | 12 | [2] | 7 | 1 | 7 | 1 |
| *** | | | | | | |
| $t_D$ | 12 | 2 | (9) | 1 | 7 | 1 |
| $t_E$ | [10] | 2 | (7) | 1 | 7 | 1 |
| $t_F$ | 10 | 2 | (7) | 1 | [?] | [?] |

TIME

*FIG. 12C*

METHOD FOR PROVIDING PARITY IN A RAID SUB-SYSTEM USING NON-VOLATILE MEMORY

CROSS-REFERENCE TO RELATED APPLICATION

This is a file-wrapper continuation of patent application Ser. No. 08/071,798, filed Jun. 4, 1993, now abandoned.

BACKGROUND OF THE INVENTION

1. Field of the Invention

The present invention is related to the field of error correction techniques for an array of disks.

2. Background Art

A computer system typically requires large amounts of secondary memory, such as a disk drive, to store information (e.g. data and/or application programs). Prior art computer systems often use a single "Winchester" style hard disk drive to provide permanent storage of large amounts of data. As the performance of computers and associated processors has increased, the need for disk drives of larger capacity, and capable of high speed data transfer rates, has increased. To keep pace, changes and improvements in disk drive performance have been made. For example, data and track density increases, media improvements, and a greater number of heads and disks in a single disk drive have resulted in higher data transfer rates.

A disadvantage of using a single disk drive to provide secondary storage is the expense of replacing the drive when greater capacity or performance is required. Another disadvantage is the lack of redundancy or back up with a single disk drive. When a single disk drive is damaged, inoperable, or replaced, the system is shut down.

One prior art attempt to reduce or eliminate the above disadvantages of single disk drive systems is to use a plurality of drives coupled together in parallel. Data is broken into chunks that may be accessed simultaneously from multiple drives in parallel, or sequentially from a single drive of the plurality of drives. One such system of combining disk drives in parallel is known as "redundant array of inexpensive disks" (RAID). A RAID system provides the same storage capacity as a larger single disk drive system, but at a lower cost. Similarly, high data transfer rates can be achieved due to the parallelism of the array.

RAID systems allow incremental increases in storage capacity through the addition of additional disk drives to the array. When a disk crashes in the RAID system, it may be replaced without shutting down the entire system. Data on a crashed disk may be recovered using error correction techniques.

RAID Arrays

RAID has six disk array configurations referred to as RAID level 0 through RAID level 5. Each RAID level has advantages and disadvantages. In the present discussion, only RAID levels 4 and 5 are described. However, a detailed description of the different RAID levels is disclosed by Patterson, et al. in *A Case for Redundant Arrays of Inexpensive Disks (RAID)*, ACM SIGMOD Conference, June 1988. This article is incorporated by reference herein.

RAID systems provide techniques for protecting against disk failure. Although RAID encompasses a number of different formats (as indicated above), a common feature is that a disk (or several disks) stores parity information for data stored in the array of disks. A RAID level 4 system stores all the parity information on a single parity disk, whereas a RAID level 5 system stores parity blocks throughout the RAID array according to a known pattern. In the case of a disk failure, the parity information stored in the RAID subsystem allows the lost data from a failed disk to be recalculated.

FIG. 1 is a block diagram illustrating a prior art system implementing RAID level 4. The system comprises N+1 disks 112–118 coupled to a computer system, or host computer, by communication channel 130. In the example, data is stored on each hard disk in 4 KByte (KB) blocks or segments. Disk 112 is the Parity disk for the system, while disks 114–118 are Data disks 0 through N–1. RAID level 4 uses disk "striping" that distributes blocks of data across all the disks in an array as shown in FIG. 1. A stripe is a group of data blocks where each block is stored on a separate disk of the N disks along with an associated parity block on a single parity disk. In FIG. 1, first and second stripes 140 and 142 are indicated by dotted lines. The first stripe 140 comprises Parity 0 block and data blocks 0 to N–1. In the example shown, a first data block 0 is stored on disk 114 of the N+1 disk array. The second data block 1 is stored on disk 116, and so on. Finally, data block N–1 is stored on disk 118. Parity is computed for stripe 140 using well-known techniques and is stored as Parity block 0 on disk 112. Similarly, stripe 142 comprising N data blocks is stored as data block N on disk 114, data block N+1 on disk 116, and data block 2N–1 on disk 118. Parity is computed for stripe 142 and stored as parity block 1 on disk 112.

As shown in FIG. 1, RAID level 4 adds an extra parity disk drive containing error-correcting information for each stripe in the system. If an error occurs in the system, the RAID array must use all of the drives in the array to correct the error in the system. RAID level 4 performs adequately when reading small pieces of data. However, a RAID level 4 array always uses the dedicated parity drive when it writes data into the array.

RAID level 5 array systems also record parity information. However, a RAID level 5 system does not keep all of the parity sectors on a single drive. RAID level 5 rotates the position of the parity blocks through the available disks in the disk array of N+1 disks. Thus, RAID level 5 systems improve on RAID 4 performance by spreading parity data across the N+1 disk drives in rotation, one block at a time. For the first set of blocks, the parity block might be stored on the first drive. For the second set of blocks, it would be stored on the second disk drive. This is repeated so that each set has a parity block, but not all of the parity information is stored on a single disk drive. In RAID level 5 systems, because no single disk holds all of the parity information for a group of blocks, it is often possible to write to several different drives in the array at one instant. Thus, both reads and writes are performed more quickly on RAID level 5 systems than an RAID 4 arrays.

FIG. 2 is a block diagram illustrating a prior art system implementing RAID level 5. The system comprises N+1 disks 212–218 coupled to a computer system or host computer 120 by communication channel 130. In stripe 240, parity block 0 is stored on the first disk 212. Data block 0 is stored on the second disk 214, data block 1 is stored on the third disk 216, and so on. Finally, data block N–1 is stored on disk 218. In stripe 242, data block N is stored on the first disk 212. The second parity block 1 is stored on the second disk 214. Data block N+1 is stored on disk 216, and so on. Finally, data block 2N–1 is stored on disk 218. In M–1 stripe 244, data block MN–N is stored on the first disk 212. Data block MN–N+1 is stored on the second disk 214. Data block MN–N+2 is stored on the third disk 216, and so on. Finally, parity block M−1 is stored on the n+1 disk 218. Thus, FIG. 2 illustrates that RAID level 5 systems store the same parity information as RAID level 4 systems, however, RAID level 5 systems rotate the positions of the parity blocks through the available disks 212–218.

In RAID level 5, parity is distributed across the array of disks. This leads to multiple seeks across the disk. It also inhibits simple increases to the size of the RAID array since a fixed number of disks must be added to the system due to parity requirements.

The prior art systems for implementing RAID levels 4 and 5 have several disadvantages. The first disadvantage is that, after a system failure, the parity information for each stripe is inconsistent with the data blocks stored on the other disks in the stripe. This requires the parity for the entire RAID array to be recalculated. The parity is recomputed entirely because there is no method for knowing which parity blocks are incorrect. Thus, all the parity blocks in the RAID array must be recalculated. Recalculating parity for the entire RAID array is highly time consuming since all of the data stored in the RAID array must be read. For example, reading an entire 2 GB disk at maximum speed takes 15 to 20 minutes to complete. However, since few computer systems are able to read very many disks in parallel at maximum speed, recalculating parity for a RAID array takes even longer.

One technique for hiding the time required to recompute parity for the RAID array is to allow access to the RAID array immediately, and recalculate parity for the system while it is on-line. However, this technique suffers two problems. The first problem is that, while recomputing parity, blocks having inconsistent parity are not protected from further corruption. During this time, a disk failure in the RAID array results in permanently lost data in the system. The second problem with this prior art technique is that RAID subsystems perform poorly while calculating parity. This occurs due to the time delays created by a plurality of input/output (I/O) operations imposed to recompute parity.

The second disadvantage of the prior art systems involves writes to the RAID array during a period when a disk is not functioning. Because a RAID subsystem can recalculate data on a malfunctioning disk using parity information, the RAID subsystem allows data to continue being read even though the disk is malfunctioning. Further, many RAID systems allow writes to continue although a disk is malfunctioning. This is disadvantageous since writing to a broken RAID array can corrupt data in the case of a system failure. For example, a system failure occurs when an operating system using the RAID array crashes or when power for the system fails or is otherwise interrupted. Prior art RAID subsystems do not provide protection for this sequence of events.

SUMMARY OF THE INVENTION

The present invention is a method for providing error correction for an array of disks using non-volatile random access memory (NV-RAM).

Non-volatile RAM is used to increase the speed of RAID recovery from disk error(s). This is accomplished by keeping a list of all disk blocks for which the parity is possibly inconsistent. Such a list of disk blocks is smaller than the total number of parity blocks in the RAID subsystem. The total number of parity blocks in the RAID subsystem is typically in the range of hundreds of thousands of parity blocks. Knowledge of the number of parity blocks that are possibly inconsistent makes it possible to fix only those few blocks, identified in the list, in a significantly smaller amount of time than is possible in the prior art. The present invention also provides a technique of protecting against simultaneous system failure and a broken disk and of safely writing to a RAID subsystem with one broken disk.

BRIEF DESCRIPTION OF THE DRAWINGS

FIGS. 3A–3C are prior art diagrams illustrating recomputation of data stored in a "stripe";

FIG. 9 is a prior art timing diagram illustrating data corruption for simultaneous system and disk failures;

FIGS. 10A–10C are timing diagrams of the present invention preventing data corruption for simultaneous system and disk failures;

FIGS. 12A–12C are timing diagrams for parity by recalculation.

DETAILED DESCRIPTION OF THE PRESENT INVENTION

Figure 1:
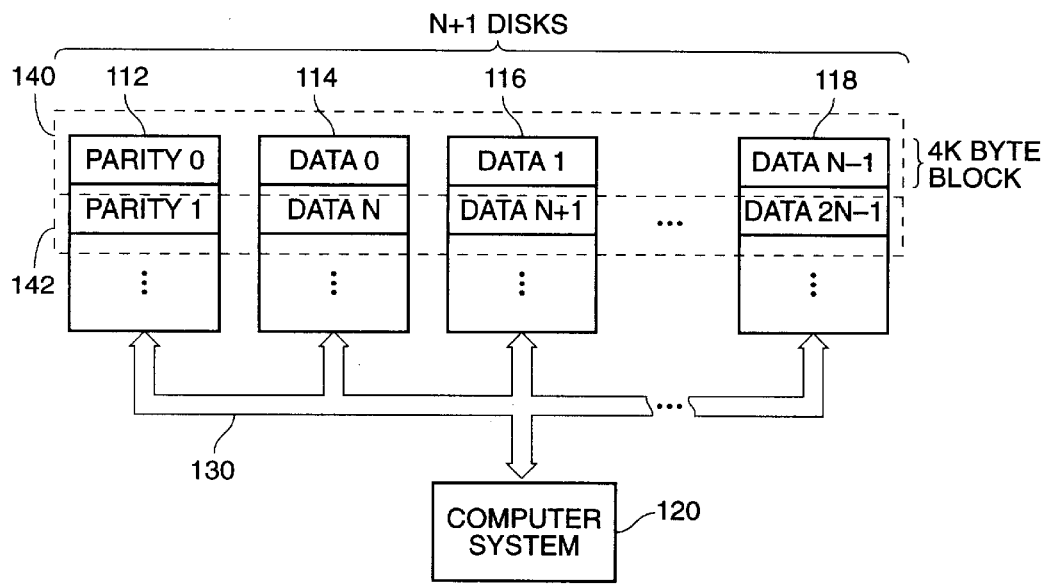
FIG. 1 is a block diagram of a prior art RAID level 4 subsystem.
Figure 2:
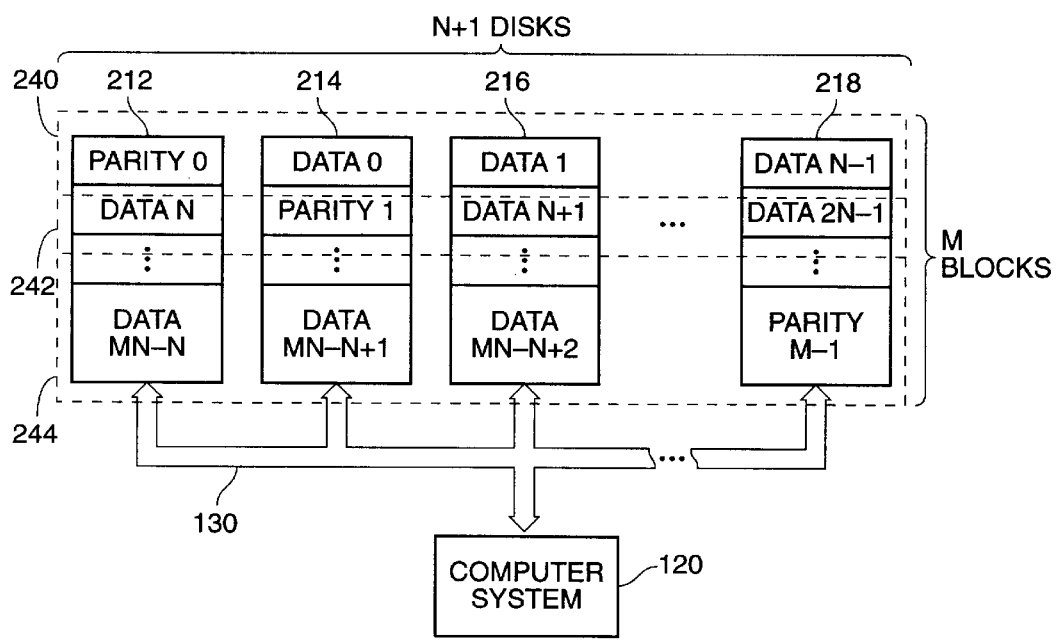
FIG. 2 is a block diagram of a prior art RAID level 5 subsystem.

A method and apparatus for providing error correction for an array of disks using non-volatile random access memory (NV-RAM) is described. In the following description, numerous specific details, such as number and nature of disks, disk block sizes, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

In particular, many examples consider the case where only one block in a stripe is being updated, but the techniques described apply equally well to multi-block updates.

The present invention provides a technique for: reducing the time required for recalculating parity after a system failure; and, preventing corruption of data in a RAID array when data is written to a malfunctioning disk and the system crashes. The present invention uses non-volatile RAM to reduce these problems. A description of the prior art and its corresponding disadvantages follows. The disadvantages of the prior art are described for: parity corruption on a system failure; data corruption on write with broken disk; and, data corruption with simultaneous system and disk failures.
Recomputing Lost Data with RAID Parity is computed by Exclusive-ORing the data blocks stored in a stripe. The parity value computed from the N data blocks is recorded in the parity block of the stripe. When data from any single block is lost (i.e., due to a disk failure), the lost data for the disk is recalculated by Exclusive-ORing the remaining blocks in the stripe. In general, whenever a data block in a stripe is modified, parity must be recomputed for the stripe. When updating a stripe by writing all N data blocks, parity can be computed without reading any data from disk and parity and data can be written together, in just one I/O cycle. Thus, writing to all N data blocks in a stripe requires a minimum amount of time. When writing a single data block to disk, parity-by-subtraction is used (described below). One I/O cycle is required to read the old data and parity, and a second I/O cycle is required to write the new data and parity. Because the spindles of the disks in the RAID array are not synchronized, the writes do not generally occur at exactly the same time. In some cases, the parity block will reach the disk first, and in other cases, one of the data blocks will reach the disk first. The techniques described here do not depend on the order in which blocks reach the disk.

Another alternative for disks having non-synchronized spindles is for parity to be computed first and the parity block written to disk before a data block(s) is written to disk. Each data block on a disk in the RAID array stores 4 KB of data. In the following discussion, the data in each 4 KB block is viewed as a single, large integer (64 K-bits long). Thus, the drawings depict integer values for information stored in the parity and data disk blocks. This convention is used for illustration only in order to simplify the drawings.

FIG. 3A is a diagram illustrating a prior art RAID level 4 subsystem, where N=3, comprising four disks, 330–336. In the diagram, disk 330 is the parity disk. Disks 332–336 are data disks. The diagram illustrates a stripe 320 contained on the disks 330–336 in the RAID array. Disk block 330A is a parity block containing the integer value 12. Disk blocks 332A–336A are data blocks of the stripe 320, respectively. Data blocks 332A–336A contain data values of 4, 7 and 1, respectively. Data for each block 332A–336A in a single stripe 320 is represented as an integer. Parity for stripe 320 is represented as the sum of data values stored in data blocks 332A–336A. Parity block 330A contains the value 12 (i.e., 4+7+1). FIG. 3A is a drawing that is merely one example of an error correction technique using parity. The parity value is the Exclusive-OR of the data blocks 332A–336A, but the mathematical properties of addition match those of the Exclusive-OR function. Therefore, addition is used in FIG. 3A.

FIG. 3B is a prior art timing diagram of activity on the stripe 320 illustrated in FIG. 3A. The table has headings of Parity, Data 0, Data 1 and Data 2. The values 12, 4, 7 and 1 are illustrated under the corresponding table headings.

FIG. 3B is a table illustrating a stripe having a lost data block at time $T_B$. As illustrated in FIG. 3B, stripe 320 contains lost data in data block 1 from data disk 334 of FIG. 3A. This is illustrated in the table by a question mark enclosed in a box under the data 1 heading. At time $T_A$, parity, data 0 and data 2 have values of 12, 4 and 1, respectively. The data on disk 334 for data block 1 can be recalculated in real time as follows:

$$\text{Data 1} = \text{Parity} - \text{Data 0} - \text{Data 2} = 12 - 4 - 1 = 7, \quad (1)$$

where data block 1 is computed using the parity block, data block 0 and data block 2. Thus, the data value 7 stored in data block 1 of disk 334 shown in FIG. 3A can be recomputed at time $T_C$. In FIG. 3B, at time $T_C$, the value 7 that has been recomputed for data block 1, is indicated by being enclosed within parentheses. In subsequent figures, recomputed values are represented using parentheses. That is, the parentheses indicate data for a broken disk as computed by the parity and data on the other disks.

As shown in FIG. 3B, data on a broken disk can be recomputed using the parity disk and the remaining disks in the disk array. The broken disk 334 of FIG. 3A can eventually be replaced and the old contents of the disk can be recalculated and written to a new disk. FIG. 3C is a prior art block diagram of the RAID subsystem containing a new data 1 disk 338. As shown in FIG. 3C, stripe 320 has values of 12, 4, 7 and 1 for parity, data 0, new data 1 and data 2. These values are stored in parity block 330A and data blocks 332A, 338A and 336A. Thus, a new disk 338 replaces broken disk 334 of the RAID system, and the data value stored previously in data block 334A of disk 334 can be computed as shown above and stored in data block 338A of replacement disk 338.

When new data is written to a data block, the parity block is also updated. Parity is easily computed, as described above, when all data blocks in a stripe are being updated at once. When this occurs, the new value for parity is recalculated from the information being written to the disks. The new parity and data blocks are then written to disk. When only some of the data blocks in a stripe are modified, updating the parity block is more difficult since more I/O operations are required. There are two methods for updating parity in this case: parity update by subtraction; and, parity update by recalculation.

For example, when a single data block is written, the RAID system can update parity by subtraction. The RAID system reads the parity block and the block to be overwritten. It first subtracts the old data value from the parity value, adds the new data value of the data block to the intermediate parity value, and then writes both the new parity and data blocks to disk.

For recalculation of parity, the RAID system first reads the other N−1 data blocks in the stripe. After reading the N−1 data blocks, the RAID system recalculates parity from scratch using the modified data block and the N−1 data blocks from disk. Once parity is recalculated, the new parity and data blocks are written to disk.

Both the subtraction and recalculation techniques for updating parity can be generalized to situations where more than one data block is being written to the same stripe. For subtraction, the parity blocks and the current contents of all data blocks that are about to be overwritten are first read from disk. For recalculation, the current contents of all data blocks that are not about to be overwritten are first read from disk. The instance where all N data blocks in the stripe are written simultaneously is a degenerate case of parity by recalculation. All data blocks that are not being written are first read from disk, but in this instance, there are no such blocks.

How Stripes Become Inconsistent During System Failure

An inconsistent stripe comprises a parity block that does not contain the Exclusive-OR of all other blocks in the stripe. A stripe becomes inconsistent when a system failure occurs while some of the writes for an update have been completed but others have not. For example, when a first data block is being overwritten. As previously described, the parity block for the stripe is recomputed and overwritten as well as the data block. When the system fails after one of the data blocks has been written to disk, but not the other, then the stripe becomes inconsistent.

A stripe can only become inconsistent when it is being updated. Thus, the number of potentially inconsistent stripes at any instant is limited to the number of stripes that are being updated. For this reason, the present invention maintains a list in NV-RAM comprising all the stripes that are currently being updated. Since only these stripes can potentially be corrupted, parity is recalculated after a system failure for only the stripes stored in the list in NV-RAM. This greatly reduces the total amount of time required for recalculating parity after a system failure in comparison to the prior art methods, described previously, that take much longer.

Parity Corruption on a System Failure in the Prior Art

In the following diagrams, the value indicated within parentheses for a malfunctioning data disk is not an actual value stored on disk. Instead, it is a calculated value retained in memory for the broken disk in the RAID array.

Figure 4A:
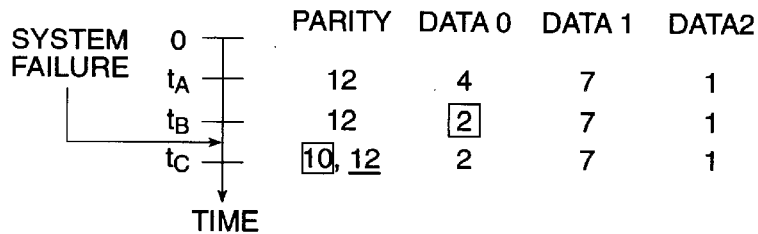
FIGS. 4A–4B are prior art timing diagrams for parity corruption on system failure.

FIG. 4A is a prior art diagram illustrating a system crash while changing values are written to disks 330–336 of FIG. 3A. The diagram is for the case where the data block reaches the disk before the parity block. As indicated in FIG. 4A, time is increasing in a downward direction. At time $T_A$, the parity block has a value of 12 and data blocks 0 to 2 have values of 4, 7, and 1, respectively. At time $T_B$, a new value of 2 is written (indicated by a box around the value 2) to data block 0, thereby replacing the value of 4 that is stored in data block 0 at time $T_A$. The other values stored in data blocks 1 and 2 do not change. When operating normally, the prior art writes a new parity value of 10 (indicated by a box) at time $T_C$ to the parity disk as indicated under the parity heading. This updates the parity block for the write to data block 0 at time $T_B$. The new value of 10 for parity at time $T_C$ is computed from the values of 2, 7, and 1 of data blocks 0 to 2, respectively. Thus, the timing diagram in FIG. 4A illustrates a prior art RAID subsystem in the case where the data block reaches disk before the parity block.

When a system failure occurs between time $T_B$ and $T_C$ in FIG. 4A, parity is corrupted for the stripe. The timing diagram shows that a new data value of 2 is written to data disk 0 at time $T_B$ before recomputed parity for the stripe is updated. Thus, when the RAID subsystem subsequently restarts, the parity disk has the old value of 12 (indicated by an underline) instead of the correct value of 10. This occurs since the stripe was not updated before the system failure occurred. The parity for the stripe is now corrupted since:

$$\text{Parity}=\text{Data 0}+\text{Data 1}+\text{Data 2}=2+7+1=10\neq12. \quad (2)$$

Figure 4B:
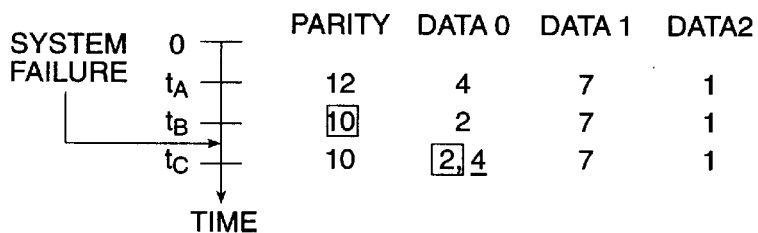

Similarly, FIG. 4B is another prior art diagram illustrating a system crash while changing values are written to disks 330–336 of FIG. 3A. The diagram is for the case where the parity block reaches disk before the data block. At time $T_A$, the parity block has a value of 12 and data blocks 0 to 2 have values of 4, 7, and 1, respectively. At time $T_B$, a new value of 10 is written (indicated by a box around the value 2) to the parity block, thereby replacing the value of 12 that is stored in the parity block at time $T_A$. The data values stored in data blocks 0–2 do not change. The new value of 10 for parity at time $T_B$ is computed from the values of 7 and 1 for data blocks 1 and 2, respectively, and the new value of 2 for data block 0. When operating normally, the prior art writes the new data value of 2 (indicated by a box) at time $T_C$ to the data disk 0 as indicated under the Data 0 heading. This updates the data block 0 in accordance with the write to the parity block at time $T_B$. Thus, the timing diagram in FIG. 4A illustrates a prior art RAID subsystem for the case where the parity block reaches disk before the data block.

When a system failure occurs between time $T_B$ and $T_C$ in FIG. 4B, parity is corrupted for the stripe. The timing diagram shows that the new parity value of 10 is written to the parity disk at time $T_B$ before data block 0 of the stripe is updated. Thus, when the RAID subsystem subsequently restarts, data disk 0 has the old value of 4 (indicated by an underline) instead of the correct value of 2. This occurs because the stripe was not updated before the system failure occurred. The parity for the stripe is now corrupted since:

$$\text{Parity}=\text{Data 0}+\text{Data 1}+\text{Data 2}=4+7+1=12\neq10. \quad (3)$$

FIGS. 4A–4B illustrate two cases of writing new data to a data block and updating the parity disk where the spindles of the disks in the RAID array are not synchronized. The first case shown in FIG. 4A illustrates a new data value reaching the data disk first, and then subsequently updating the parity value on the parity disk. The second case illustrated in FIG. 4B illustrates parity reaching disk first followed by the data update. For FIGS. 4A and 4B, when the system fails between times $T_B$ and $T_C$, corruption of the file system occurs. If the system fails after time $T_B$ in FIGS. 4A and 4B, then the parity values illustrated are not correct for the system. In the case of the system illustrated in FIG. 4A, the new data values have a sum of 10, which is equal to the values of 2, 7 and 1. However, the parity value at time $T_B$ indicates a value of 12. Thus, the parity value stored on the parity disk does not equal the new parity value for the data values stored on data disk 0–2. Similarly, if a failure occurs after time $T_B$ for the second system illustrated in FIG. 4B, the data disks 0–1 have values of 4, 7 and 1, respectively. The parity value for these data blocks is equal to 12. However, parity in this system is first updated before writing the new data value to disk, therefore, the parity stored on the parity disk at time $T_B$ is equal to 10. Thus, subsequent to time $T_B$, the parity stored on the parity disk does not equal the parity value for the data blocks since the new data was not updated before the system failed.

In the prior art, after a system fails, parity is recalculated for all of the stripes on occurrence of a system restart. This method of recalculating parity after a failure for all stripes requires intensive calculations, and therefore, is very slow. The present invention is a method for recalculating parity after a system failure. The system maintains a list of stripes having writes in progress in non-volatile RAM. Upon restarting after a system failure, just the list of stripes with writes in progress that are stored in non-volatile RAM are recalculated.

Data Corruption on Write with Broken Disk in the Prior Art

Figure 6:
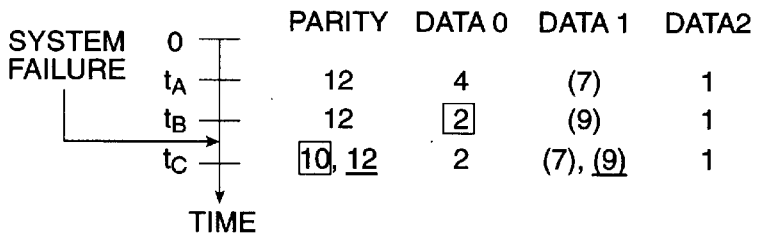
FIG. 6 is a prior art timing diagram illustrating data corruption on a write with a broken disk.

When writing to a RAID array that has a malfunctioning or broken disk, data corruption occurs during system failure. FIG. 6 is a prior art diagram illustrating data corruption for a malfunctioning disk when a system failure occurs where the data disk is updated for the new data value before parity is written to disk. In FIG. 6, data disk 1 is shown to be malfunctioning by indicating values within parentheses under the Data 1 heading. At time $T_A$, the parity disk has a value of 12. Prior to time $T_A$ when data disk 1 malfunctions, the parity disk value is equal to the sum of data disks 0 to 2 having values of 4, 7 and 1, respectively. The value of 7 for data block 1 at time $T_A$ is enclosed within parentheses. This value does not represent a value stored on data disk 1, but instead is computed from the parity block and data blocks 0 and 2 of the stripe as follows:

$$\text{Data 0}=\text{Parity}-\text{Data 1}-\text{Data 2}=12-4-1=7. \quad (4)$$

At time $T_B$, a new value of 2 is written to data disk 0 (indicated by enclosing 2 within a box). At time $T_B$, parity has not been updated for the new value of 2 written to data disk 0 and has a value of 12. Thus, the computed value for data block 1 is 9 instead of 7. This is indicated in FIG. 6 by enclosing the value 9 within parentheses for data disk 1 at time $T_B$.

When operating normally at time $T_C$, the parity block is updated to 10 due to the value of 2 written to data block 0 at time $T_B$. The new value of 10 for parity at time $T_C$ is indicated within a rectangle. For a parity value of 10, the correct value of 7 for data block 1 is indicated within parentheses. As indicated in FIG. 6, because data disk 1 is broken, the data stored in data block 1 is calculated based on the other blocks in the disk array. After the first write at time $T_B$ for data block 0, the computed value of data block 1 is incorrect. The value of 9 for data block 1 is incorrect until the second write for parity at time $T_C$ is completed.

When a system failure occurs between times $T_B$ and $T_C$, writing to a RAID array that has a malfunctioning or broken disk corrupts data in the stripe. As shown in FIG. 6 for the prior art, parity is not updated and therefore has a value of 12 (indicated by an underline). Thus, the computed value for data block 1 of the stripe is incorrect and the stripe is corrupted as follows:

$$\text{Data 1=Parity-Data 0-Data 2=12-2-1=9} \neq 7. \quad (5)$$

Similar corruption of data occurs for the case where parity reaches disk before data does.

Data Corruption with Simultaneous System and Disk Failures

RAID systems are most likely to experience a disk failure when a system failure occurs due to power interruption. Commonly, a large, transient voltage spike occurring after power interruption damages a disk. Thus, it is possible for a stripe to be corrupted by simultaneous system and disk failures.

FIG. 9 is a prior art diagram illustrating simultaneous system and disk failures where the data disk is updated for a new data value before parity is written to disk. At time $T_A$, the parity disk has a value of 12 and data disks 0–2 have values of 4, 7, and 1, respectively. At time $T_B$, a new value of 2 is written to data disk 0 (indicated by a box). At time $T_B$, parity is not updated for the new value of 2 written to data disk 0 and has a value of 12. When a system failure occurs between times $T_B$ and $T_C$, the value of disk 1 is corrupted. This occurs due to simultaneous system and disk failures between times $T_B$ and $T_C$.

At time $T_C$, parity is not updated due to the system failure and therefore has a value of 12 instead of 10. Further, data disk 1 is corrupted due to the disk failure. The computed value of 9 for data block 1 is incorrect. It is computed incorrectly for data disk 1 using the corrupt parity value as follows:

$$\text{Data 1=Parity-Data 0-Data 2=12-2-1=9} \neq 7. \quad (7)$$

Data is similarly corrupted for the case where parity reaches disk before data.

Overview of the Present Invention

Figures 7A, 7B, 8:
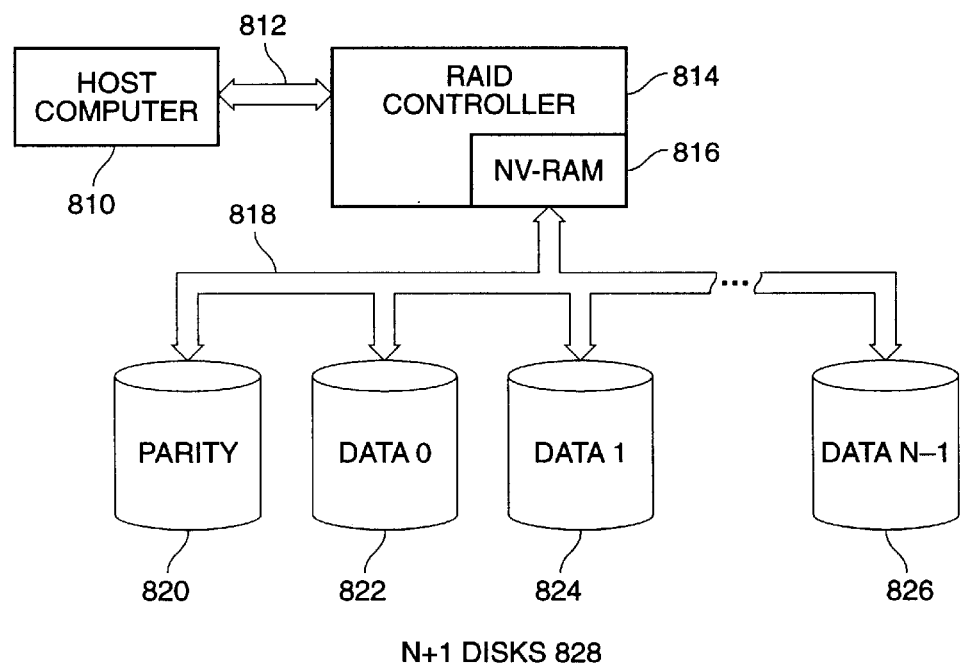
FIGS. 7A–7B are timing diagrams of the present invention for preventing data corruption on a write with a broken disk.
FIG. 8 is a diagram illustrating the present invention.

FIG. 8 is a diagram illustrating the present invention for providing error correction using NV-RAM for a RAID system comprising host computer 810, RAID controller 814 including NV-RAM 816, and N+1 disks 820–826. Host computer 810 is coupled to RAID controller 814 by a first communications channel 812. RAID controller 814 comprises NV-RAM 816 for storing stripes of the RAID array 828 that are possibly in an inconsistent state. RAID controller 814 is coupled to the N+1 disks 820–826 of the RAID array 828 by a second communications channel 818. The RAID array 828 comprises parity disk 820 and N data disks 822–826, respectively.

NV-RAM 816 is used to increase the speed of RAID recovery after a system failure by maintaining a list of all parity blocks stored on parity disk 820 that are potentially inconsistent. Typically, this list of blocks is small. It may be several orders of magnitude smaller than the total number of parity blocks in the RAID array 828. For example, a RAID array 828 may comprise hundreds of thousands of parity blocks while the potentially inconsistent blocks may number only several hundred or less. Knowledge of the few parity blocks that are potentially inconsistent facilitates rapid recalculation of parity, since only those parity blocks have to be restored.

The present invention also uses NV-RAM 816 to safely write data to a RAID array 828 having a broken disk without corrupting data due to a system failure. Data that can be corrupted is copied into NV-RAM 816 before a potentially corrupting operation is performed. After a system failure, the data stored in NV-RAM 816 is used to recover the RAID array 828 into a consistent state.

Figure 11A:
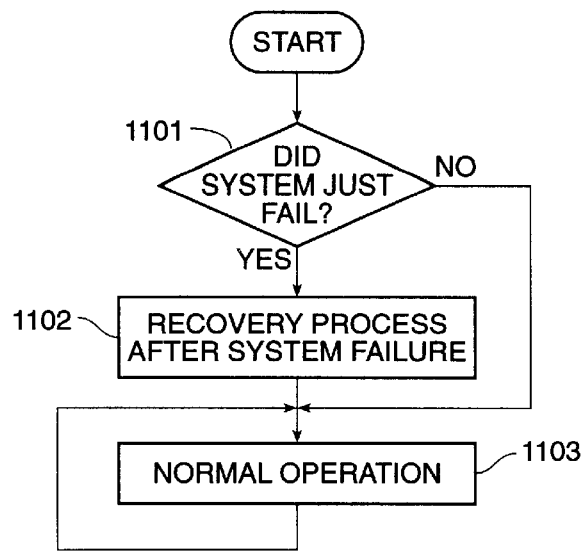
FIGS. 11A–11C are flow diagrams of the present invention illustrating the process of recovery.
Figure 11B:
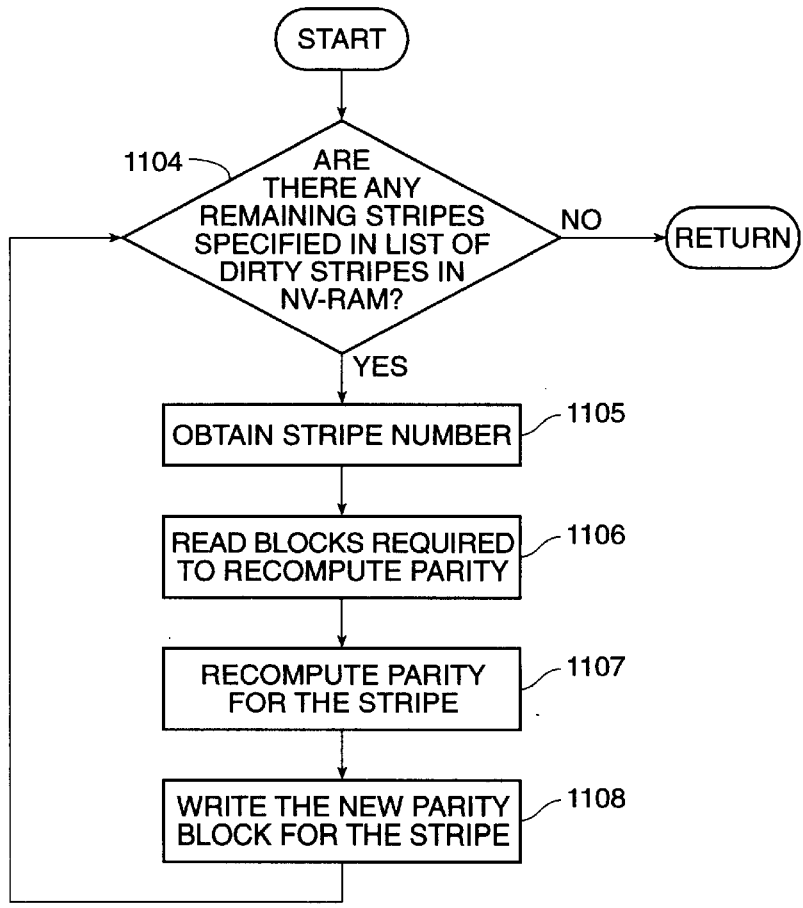
Figure 11C:
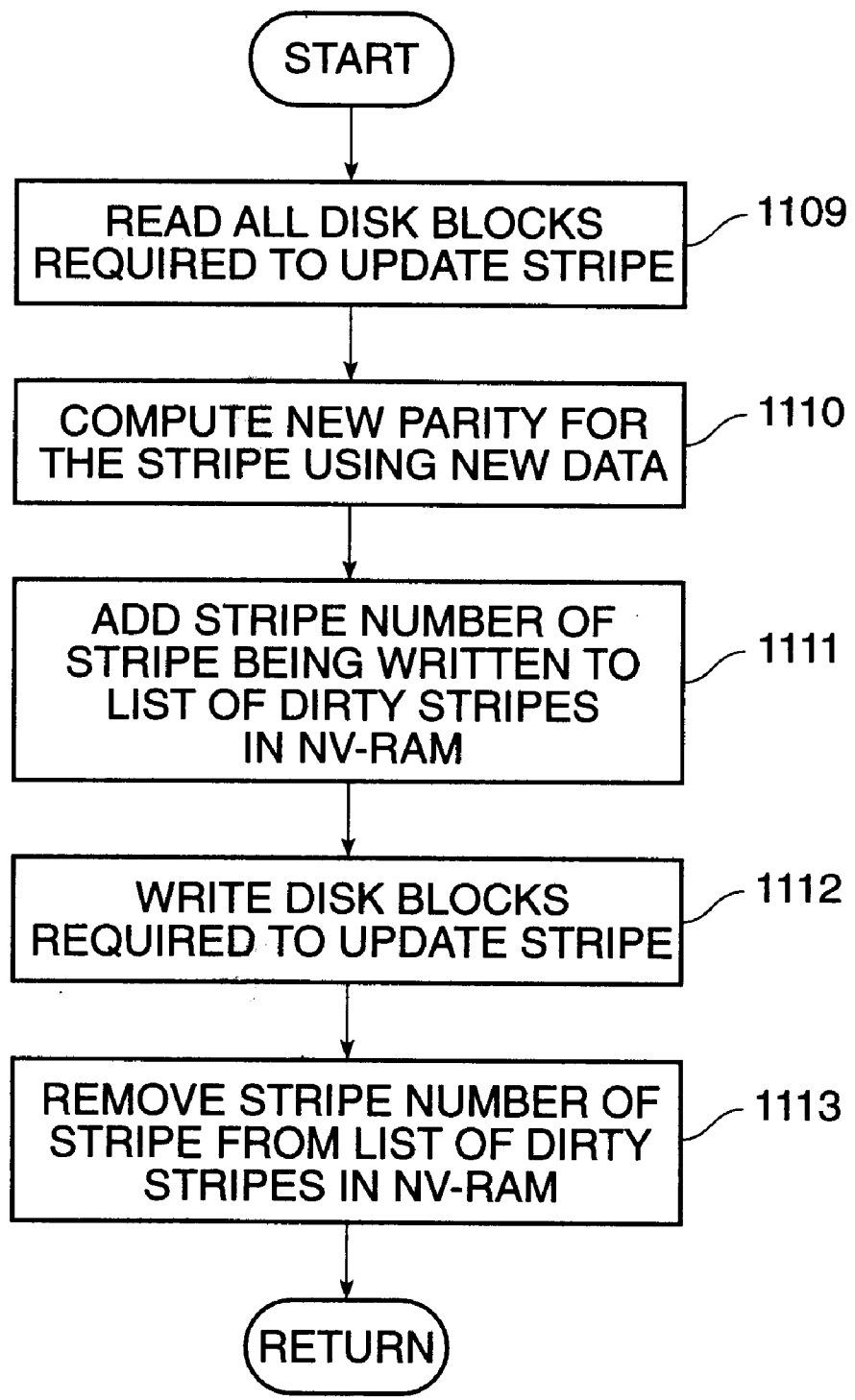

FIGS. 11A–C are flow diagrams illustrating the steps performed by the present invention. Referring first to FIG. 11A, a boot operation is executed. At decision block 1101 a check is made to determine if the system has just failed. If decision block returns true, the system proceeds to step 1102 (FIG. 11B) and executes a recovery process. If decision block returns false, the system proceeds to step 1103 (FIG. 11C) for normal operation.

Referring now to FIG. 11B, a flow diagram of recovery after system failure is illustrated. At decision block 1104 a check is made to determine if there are any remaining stripes specified in the list of dirty stripes in NV-RAM. If decision block 1104 returns false, the system proceeds to a return step. If decision block 1104 returns true, the system proceeds to step 1105.

At step 1105, the stripe number is obtained. At step 1106, the data blocks of the identified stripe required to recompute parity are read. Parity is recomputed for the stripe at step 1107. At step 1108, the new parity block for the stripe is written. The system then returns to decision block 1104.

Normal operation is illustrated in FIG. 11C. At step 1109, all blocks required to update a stripe are read. At step 1110 a new parity for the stripe is computed using the new data. The stripe number of that stripe is written to the list of dirty stripes in NV-RAM at step 1111. At step 1112, the disk blocks required to update the stripe are written to disk. At step 1113 the number of the stripe is removed from the list of dirty stripes in NV-RAM.

Parity Corruption for a System Failure Using NV-RAM

Figure 5:
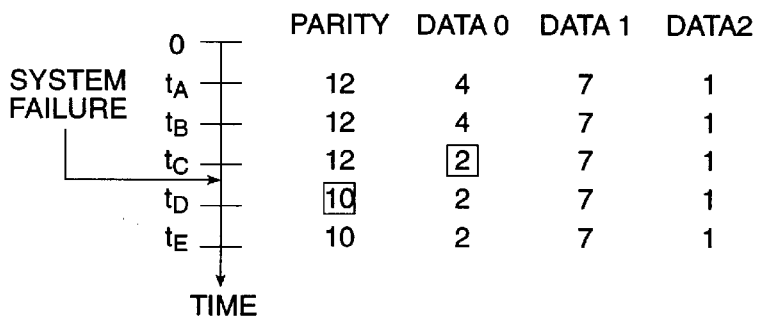
FIG. 5 is a timing diagram of the present invention for preventing data corruption on occurrence of a write to a malfunctioning disk.

FIG. 5 is a diagram illustrating the present invention for preventing corruption of parity using NV-RAM. The timing diagram is described with reference to FIGS. 11A–C. FIG. 5 is a timing diagram for the present invention illustrating a system crash while changing values are written to disks 330–336 of FIG. 3A. The diagram is for the case where parity is computed for a new data value and the data is written to disk prior to updating the parity block. At time $T_A$, the parity block has a value of 12 and data blocks 0 to 2 have values of 4, 7, and 1, respectively. At time $T_A$, step 1109 of FIG. 11C for the present invention is performed where blocks necessary to update the stripe are read into memory. The system performs step 1110 where a new parity value is computed dependent upon the new data value(s). At time $T_B$, step 1111 of FIG. 11C is performed where the stripe number is written to NV-RAM.

At time $T_C$, in step 1112, the new data value of 2 is written (indicated by a box around the value 2) to data block 0, thereby replacing the value of 4 that is stored in data block 0 at time $T_B$. The other values stored in data blocks 1 and 2 do not change. First, consider the normal case where the system does not fail. The present invention writes a new parity value of 10 (indicated by a box under the parity heading) at time $T_D$ in step 1112. This updates the parity block for the write to data block 0 at time $T_C$. At time $T_E$, in step 1113, the stripe number in NV-RAM is cleared. Thus, the stripe comprising the blocks for the parity disk and data disks 0–2 have values of 10, 2, 7, and 1, respectively.

Next, consider the case when the system does fail between time $T_C$ and $T_D$ (between steps 1111 and 1113). The system reboots, and begins execution at START in FIG. 11A.

In decision block 1101, at time $T_D$, after a system fault occurs, decision block 1101 returns true (Yes). The stripe has a value of 12 for parity and values for data disks 0–2 of 2, 7, and 1, respectively. As illustrated in FIG. 5 for time $T_C$, parity is corrupted after a system failure since:

$$\text{Parity}=\text{Data } 0+\text{Data } 1+\text{Data } 2=2+7+1=10 \neq 12. \quad (9)$$

However, the stripe can be recovered to a consistent state. NV-RAM includes an indication of the stripes that are candidates for recovery, i.e., a list of stripes that are being updated. Everything but the parity value is available on disk (the "2" having been written to disk at time $T_C$). The data values for the stripe are read from disk and a new parity value of 10 is calculated.

$$\text{Parity}=\text{Data } 0+\text{Data } 1+\text{Data } 2=2+7+1=10. \quad (10)$$

Thus, the newly calculated parity value of 10 is written to the parity disk in step 1108 at time $T_D$, and the stripe is no longer corrupt.

The following is an example of pseudo code that describes the operation of FIG. 11C:

(1) Read all disk blocks required to update stripe.

(2) Calculate new parity contents.

(3) Add stripe # for stripe being written to NV-RAM dirty stripe list.

(4) Write all disk blocks required to update stripe.

(5) Remove stripe # for stripe just written from NV-RAM dirty stripe list.

After a system failure, a part of the start-up procedure of FIG. 11B can be described by the following pseudo code:

```
for (all stripes specified in the NV-RAM dirty stripe list)
{
    (1) Read all data blocks in the stripe.
    (2) Recompute the parity block for the stripe.
    (3) Write the new parity block for the stripe.
}
```

Thus, the present invention prevents parity corruption after a system failure by using NV-RAM.

Parity Corruption Detection with a Bitmap Instead of a List

The previous section describes a technique in which a list of potentially corrupted stripes is kept in NV-RAM so that on reboot after a system failure, only the stripes in the list need to have their parity blocks recalculated. An alternate embodiment of the present invention uses a bitmap in NV-RAM to indicate the potentially corrupted stripes whose parity blocks must be recalculated after a system failure.

This technique uses a bitmap in which each bit represents a group of one or more stripes. A typical disk array might have 250,000 stripes. If each entry in the bitmap represents a single stripe, the bitmap will be about 32 KB. Letting each bit represent a group of 32 adjacent stripes reduces the size to 1 KB.

After a system failure, this technique is essentially identical to the "list of stripes" technique, except that the bitmap is used to determine which stripes need parity recalculation instead of the list. All stripes in groups whose bit is set in the bitmap have their parity recalculated.

Managing the bitmap during normal operation is slightly different than managing the list. It is no longer possible to clear a stripe's entry as soon as the update is complete, because a single bit can indicate activity in more than one stripe. One stripe's update may be done, but another stripe sharing the same bit may still be active.

Instead, the appropriate bit for a stripe is set just before the stripe is updated, but it is not cleared after the update is complete. Periodically, when the bitmap has accumulated too many entries, all blocks are flushed to disk, ensuring that there can be no inconsistent stripes, and the entire bitmap is cleared. The following pseudo-code implements this:

(1) Read all blocks required to update stripe.

(2) Calculate new parity contents.

(3) Set bitmap entry for stripe being updated.

(4) Write all disk blocks required to update stripe.

(5) If bitmap is too full, wait for all blocks to reach disk and clear the entire bitmap.

In case of system failure, the bitmap results in more blocks to clean than the list, but the savings are still considerable compared with recomputing parity for all stripes in the system. A typical RAID system has 250,000 stripes, so even if 2,500 potentially-corrupted stripes are referenced in the bitmap, that is just 1% of the stripes in the system.

The bitmap technique is especially useful with write-caching disks which don't guarantee that data will reach disk in the case of power failure. Such disks may hold data in RAM for some period before actually writing it This means that parity corruption is still a possibility even after the stripe update phase has completed. The list technique would not work, because the stripe's parity is still potentially corrupted even though the stripe has been removed from the list.

Thus, using the bitmap technique and instructing each disk to flush its internal cache at the same time that the bitmap is cleared, allows the invention to work in combination with write-caching disk drives.

Data Corruption on Write with Broken Disk Using NV-RAM

The present invention solves this problem for data corruption on occurrence of a write with a malfunctioning disk by saving data from the broken disk in non-volatile RAM. FIG. 7A is a timing diagram of the present invention for preventing data corruption by storing data from a malfunctioning disk in NV-RAM. The drawing is discussed with reference to FIGS. 11A–C. In FIG. 7A, data is written to disk before parity is updated. At time $T_A$, broken data disk 1 is illustrated having a value of 7 indicated within parentheses. The value of 7 within parentheses indicates that data disk 1 is malfunctioning and that it is the computed value for the disk. This value is computed by subtracting the values of 4 and 1 of data disks 0 and 2 from the value of 12 stored in the parity disk. In step 1109, the stripe is read from the RAID array at time $T_A$. The NV-RAM is erased. This is indicated in FIG. 7A by a question mark under the heading for NV-RAM.

At time $T_B$, a value of 7 for the malfunctioning data disk 1 is written into NV-RAM according to step 1109. The value of 7 for data disk 1 that is written into NV-RAM is indicated by a rectangular box in FIG. 7A. The system then computes a new value of parity for the strip At time 1110 of FIG. 11C.

At time $T_C$, a new value of 2 (indicated by a box) for data disk 0 is written to the disk before parity for the stripe is updated according to step 1112. Therefore, at time $T_C$, the value for data disk 1 is 9 and is indicated within parentheses accordingly. In the normal case, where the system does not fail, a new parity value of 10 is written to disk at time $T_D$, and the computed value of disk 1 becomes 7 again, which is correct. When a system failure occurs between times $T_C$ and $T_D$, a new value of parity is updated correctly using NV-RAM with respect to the value of 2 written to data disk 0 at time $T_C$.

The parity is correctly updated at time $T_D$ by first reading the value for all functioning data disks, according to step 1106, and the value for broken data disk 1 stored in NV-RAM, and recalculating its value as follows:

$$\text{Parity}=\text{Data }\mathbf{0}+\text{NV-RAM}+\text{Data }\mathbf{2}=2+7+1=10. \quad (12)$$

Thus, a correct value of 10 is computed for parity when the present invention restarts after a system crash. In step 1108, the value of 10 is written to the parity disk at time $T_D$, thus returning the computed value of D1 to 7, which is correct. At time $T_E$, NV-RAM is cleared in step 1113. Thus, the present invention prevents data from being corrupted by a system fault when a disk is malfunctioning by using NV-RAM.

FIG. 7B is a timing diagram of the present invention for preventing data corruption by storing data from a malfunctioning disk in NV-RAM for the case where parity is written to disk before data is updated. At time $T_A$, broken data disk 1 is illustrated having a value of 7 indicated within parentheses. This value is computed as described above with reference to FIG. 7A. In step 1109, the stripe is read from the RAID array at time $T_A$. The NV-RAM is cleared which is indicated by a question mark under the heading for NV-RAM.

At time $T_B$, a value of 7 for the malfunctioning data disk 1 is written into NV-RAM according to step 1109. The value of 7 for data disk 1 that is written into NV-RAM is indicated by a rectangular box in FIG. 7B. The system then computes a new value of parity for the stripe in step 1110 of FIG. 11.

At time $T_C$, a new value of 10 (indicated by a box) for parity is written to the parity disk in step 1108 before data block 0 is updated. Therefore, at time $T_C$, the value for data disk 1 is 5 and is indicated within parentheses accordingly. When a system failure occurs between times $T_C$ and $T_D$, a new parity value is updated correctly for the parity disk using NV-RAM. At decision block 1101 after the system reboots, a check is made if a system failure occurred. The decision block accordingly returns true (Yes) in the present example, and continues at step 1104.

Parity is correctly updated at time $T_D$ by recalculating its value as follows:

$$\text{Parity}=\text{NV-data for broken disk }(7)+\text{on-disk data for all non broken disks}=4+7+1=12. \quad (13)$$

Thus, as shown in FIGS. 7A–7B, when the system is about to write to a stripe, it saves the value for malfunctioning data disk 1 in non-volatile RAM. It then writes the new value for data disk 0 (or parity in the case of FIG. 7B) to disk. If a system crash occurs after the new value is written to disk 0 (the parity disk in FIG. 7B) at time $T_C$, the value for data disk 1 is corrupt. After the system failure, the new value of parity is calculated using the value stored in NV-RAM instead of the computed value for data disk 1. The value of parity is then written to disk. Once this is completed, NV-RAM is erased.

Simultaneous System and Disk Failure Using NV-RAM

The present invention solves the problem of parity and data corruption when simultaneous system and disk failures occur by saving blocks of stripes in NV-RAM. Using NV-RAM allows the system to be recovered to a consistent state when a system crash occurs while updating multiple blocks in the system. Changing these data blocks further requires that the parity of the stripe be updated. The present invention always saves into NV-RAM any block that is read from disk (e.g., before updating data block 0, read it into NV-RAM) for this purpose. Thus, stripe information can be recomputed from the data stored in NV-RAM. The present invention provides two solutions for this using parity by subtraction and parity by recalculation.

In parity by subtraction, data including parity and data blocks is read from disk before it is updated. FIG. 10A is a timing diagram of the present invention for preventing parity and data corruption by storing blocks of a stripe in NV-RAM. The drawing is discussed with reference to FIGS. 11A–C. In FIG. 10A, data is written to disk before parity is updated. At time $T_A$, the parity block and data block 0 are read from the RAID array. The NV-RAM is erased. This is indicated in FIG. 10A by a question mark under the heading for NV-RAM.

At time $T_B$, the parity block and data block 0 are written into NV-RAM as they are read from disk. The system then computes a new value of parity for a value of 2 for data block 0.

At time $T_C$, the new value of 2 (indicated by a box) for data disk 0 is written to the disk before parity for the stripe is updated. When a system failure occurs between times $T_C$ and $T_D$, a disk in the RAID array malfunctions; the present invention provides solutions for the three cases of a broken disk: the parity disk; data disk 0; and, data disk 1 (or 2). At decision block 1101, a check is made if a system failure occurred. The decision block accordingly returns true (Yes) in the present example, and continues at step 1104. The three cases of a broken disk due to system failure where parity is calculated by subtraction are shown in FIGS. 10A–10C, respectively.

At time $T_D$ in FIG. 10A, the parity disk malfunctions due to the system failure between times $T_C$ and $T_D$. In this case, there is nothing to be done. No data is lost, and no information can be written to the parity disk.

Referring to FIG. 10B, at time $T_D$, data disk 0 malfunctions due to the system failure between times $T_C$ and $T_D$. The general equation for recalculating parity in this case is:

parity = "NV-value for broken disk"
+"on-disk values for all non-broken disks"

In the present example that becomes:

parity=NV(Data 0)+Data 1+Data 2=4+7+1=12

In effect, the parity is being updated so as to restore the broken disk to the value stored for it in the NV-RAM. In this particular example, the new value for parity happens to match the old value. If other data blocks besides data 0 were also being updated, and if one of them reached disk before the system failure, then the new parity value would not match the old.

Referring to FIG. 10C, at time $T_D$, data disk 1 malfunctions due to the system failure between times $T_C$ and $T_D$. This case is handled by reading the parity and data disk 0 values from NV-RAM in step 1114 and writing them to disk (indicated by a box). Thus, the change to data disk 0 is overwritten, but the stripe is returned to a consistent state. Data disk 1 is indicated as being broken at times $T_D$ and $T_E$ by enclosing its value in parentheses. Thus, the value of broken data disk 1 is correctly computed to be 7 (indicated by a box) at time $T_D$ as follows:

$$\text{Data 1} = \text{NV(Parity)} - \text{NV(Data 0)} - \text{Data 2} = 12 - 4 - 1 = 7, \quad (14)$$

where NV(Parity) and NV(Data 0) are the values for parity and data block 0 stored in NV-RAM. At time $T_E$, NV-RAM is cleared. Thus, in FIG. 10C, the stripe is maintained in a consistent state by the present invention although data disk 1 (a broken disk 2 is handled similarly) malfunctions after the system failure between times $T_C$ and $T_D$.

This case can also be addressed by first calculating the old contents of the broken disk as follows:

D1-calc = NV-parity −
"NV values for disks being updated"/ −
"on-disk values of data disks not being updated".

A new parity value is calculated based on:

parity = "D1-calc from stepabove" +
on-disk values for all unbroken data disks".

Simultaneous System and Disk Failure with Parity by Recalculation

In parity by recalculation, the data blocks that are not being updated are first read from disk, and then parity is recalculated based on these values combined with the new data about to be written. This is typically used in cases where multiple data blocks are being updated at once, because it is more efficient than parity by subtraction in those cases. For simplicity, in the present example, only one block is updated. The techniques shown apply for updates of any number of blocks.

FIGS. 12A–12C are timing diagrams for parity by recalculation. For times $T_A$, $T_B$ and $T_C$, they are all identical.

At time $T_A$ in step 1109, blocks D1 and D2 are read from disk. In step 1110, the system computes the new parity based on the new data for disk 0 along with the data just read from disks 1 and 2.

At time $T_B$ in step 1111, blocks D1 and D2 are written into NV-RAM, along with an indication of the stripe to which they belong.

At time $T_C$, during step 1112, the new value "2" is written to disk 0. In the normal case, the parity block would also have been written during step 1112, and there would be no corruption.

In the present example, there is a system failure in combination with a disk failure. When the system reboots after a system failure, execution begins at step 1101. Because there is a failure, the decision block returns true (Yes) and continues at step 1102 and performs the necessary steps to recover the RAID sub-system based on the contents of NV-RAM.

FIG. 12A shows the case where the parity disk fails. In this case, nothing needs to be done. There is no possibility of data loss, because no data disks have failed.

FIG. 12B shows the case where the disk being updated fails. Note that at time $T_D$, the calculated value for disk 0 is incorrect. In general, if multiple blocks are being updated, there is not enough information in NV-RAM to reconstruct the lost data block. This is because with parity by recalculation, it is the data that is not being updated that is loaded into NV-RAM. The data on the failed disk is not saved anywhere.

In this case, the present invention computes a new parity value that sets the contents of the failed disk to zero. The general equation for this is:

parity=sum of non-broken disks

And in this example that is:

parity=D1+D2=7+1=8

At time $T_E$, the new parity value is written, and at time $T_F$, the NV-RAM values for D1 and D2 are cleared.

With a prior-art file system that writes new data in the same location as old data, zeroing out a data block would be unacceptable. But with WAFL, which always writes new data to unused locations on disk, zeroing a block that was being written has no harmful effect, because the contents of the block were not part of the file system.

FIG. 12C shows the case where the disk not being updated fails. Note that at time $T_D$, the calculated value for disk 1 is incorrect. The equation to recalculate parity is:

parity = "NV-RAM value for failed disk" +
"on-disk values for non-failed disks:

In the present example, that is:

parity=NV(D1)+D0+D2=7+2+1=10

At time $T_E$, the new parity value is written, and at time $T_F$, the NV-RAM values for D1 and D2 are cleared.

In this manner, a method and apparatus are disclosed for providing error correction for an array of disks using non-volatile random access memory (NV-RAM).

We claim:

1. A method for maintaining a consistent file system, wherein said file system is stored in stripes of blocks in a RAID array, that allows for recovery of the file system to a consistent state after a disk failure and a system failure occur prior to successful completion of writing new data to one or more blocks of a stripe of said RAID array, said disk failure rendering a block of said stripe in said RAID array unreadable, comprising the steps of:

prior to writing new data to one or more blocks of a stripe in said RAID array, reading said one or more blocks of said stripe to obtain prior data stored in said one or more blocks of said stripe, said prior data stored in said stripe storage means comprising a prior parity value read from a parity block of said stripe and prior data read from one or more data blocks of said stripe;

storing said prior data stored in said one or more blocks of said stripe in stripe storage means;

initiating the writing of said new data to said one or more blocks of said stripe; and if said writing of said new data to said one or more blocks of said stripe in said RAID array is successfully completed, clearing said prior data from said one or more blocks of said stripe from said stripe storage means; otherwise, performing the steps of:

after a failure has occurred, checking said stripe storage means to determine whether said stripe storage means contains any prior data for any stripe;

when said stripe storage means contains prior data for any stripe, performing the steps of:

determining whether said block of said stripe in said RAID array rendered unreadable by said disk failure is one of said data blocks of said stripe in said RAID array for which prior data has been stored in said stripe storage means;

if said block of said stripe in said RAID array rendered unreadable by said disk failure is one of said data blocks of said stripe in said RAID array for which prior data has been stored in said stripe storage means, performing the steps of:

reading data from each remaining readable data block of said stripe in said RAID array other than said data block rendered unreadable by said disk failure;

recomputing a parity value for said stripe based on said prior data stored in said stripe storage means for said data block rendered unreadable by said disk failure and on said data read from said each remaining readable data block of said stripe; and writing said recomputed parity value for said stripe to said parity block of said stripe in said RAID array.

2. A method for maintaining a consistent file system, wherein said file system is stored in stripe of blocks in a RAID array, that allows for recovery of the file system to a consistent state after disk failure and system failure occur prior to completion of writing new data to one or more blocks of a stripe of said RAID array, said disk failure rendering a block of said stripe in said RAID array unreadable, comprising the steps of:

prior to writing new data to one or more blocks of a stripe in said RAID array, reading said one or more blocks of said stripe to obtain prior data stored in said one or more blocks of said stripe, said prior data stored in said stripe storage means comprising a prior parity value read from a parity block of said stripe and prior data read from one or more data blocks of said stripe;

storing said prior data stored in said one or more blocks of said stripe in stripe storage means;

initiating the writing of said new data to said one or more blocks of said stripe; and if said writing of said new data to said one or more blocks of said stripe in said RAID array is successfully completed, clearing said prior data from said one or more blocks of said stripe from said stripe storage means; otherwise, performing the steps of:

after a failure has occurred, checking said stripe storage means to determine whether said stripe storage means contains any prior data for any stripe;

when said stripe storage means contains prior data for any stripe, performing the steps of:

determining whether said block of said stripe in said RAID array rendered unreadable by said disk failure is one of said data blocks of said stripe in said RAID array other than said one or more data blocks for which prior data has been stored in said stripe storage means;

if said block of said stripe in said RAID array rendered unreadable by said disk failure is one of said data blocks of said stripe in said RAID array other than said one or more data blocks for which prior data has been stored in said stripe storage means, performing the steps of:

reading data from each remaining readable data block of said stripe in said RAID array other than said one or more data blocks of said stripe for which prior data has been stored in said stripe storage means;

computing data for said data block rendered unreadable by said disk failure based on said data read from said each remaining data block of said stripe in said RAID array other than said one or more data blocks of said RAID array for which prior data has been stored in said stripe storage means and on said prior data or said one or more data blocks of said stripe and said prior parity value for said parity block of said stripe stored in said stripe storage means;

reading data from said data blocks of said stripe in said RAID array for which prior data has been stored in said stripe storage means;

recomputing a new parity value based on said computed data for said data block rendered unreadable by said disk failure, said data read from said data blocks of said stripe in said RAID array for which prior data has been stored in said stripe storage means; and said data read from said each remaining readable data block of said stripe in said RAID array other than said one or more data blocks for which prior data has been stored in said stripe storage means; and writing said new parity value for said stripe to said parity block of said stripe in said RAID array.

3. A method for maintaining a consistent file system, wherein said file system is stored in stripes of blocks in a RAID array, that allows for recovery of the file system to a consistent state after disk failure and system failure occur prior to completion of writing new data to one or more blocks of a stripe of said RAID array, said disk failure rendering a block of said stripe in said RAID array unreadable, comprising the steps of:

prior to writing new data to one or more blocks of a stripe in said RAID array, reading said one or more blocks of said stripe to obtain prior data stored in said one or more blocks of said stripe, said prior data stored in said stripe storage means comprising a prior parity value read from a parity block of said stripe and prior data read from one or more data blocks of said stripe;

storing said prior data stored in said one or more blocks of said stripe in stripe storage means;

initiating the writing of said new data to said one or more blocks of said stripe; and if said writing of said new data to said one or more blocks of said stripe in said RAID array is successfully completed, clearing said prior data from said one or more blocks of said stripe from said stripe storage means; otherwise, performing the steps of:

after a failure has occurred, checking said stripe storage means to determine whether said stripe storage means contains any prior data for any stripe;

when said stripe storage means contains prior data for any stripe, performing the steps of:

determining whether said block of said stripe in said RAID array rendered unreadable by said disk failure is one of said data blocks of said stripe in said RAID array other than said one or more data blocks for which prior data has been stored in said stripe storage means;

if said block of said stripe in said RAID array rendered unreadable by said disk failure is one of said data blocks of said stripe in said RAID array other than said one or more data blocks for which prior data has been stored in said stripe storage means, writing said prior data for said one or more data blocks of said stripe and said prior parity value stored in said stripe storage means to said stripe in said RAID array.

4. A method for maintaining a consistent file system, wherein said file system is stored in stripes of blocks of a RAID array, that allows for recovery of the file system to a consistent state after a disk failure and a system failure occur prior to successful completion of writing new data to one or more blocks of a stripe of said RAID array, said disk failure rendering a block of said stripe in said RAID array unreadable, comprising the steps of:

prior to writing new data to one or more blocks of a stripe in said RAID array, reading any other blocks of said stripe in said RAID array other than said one or more blocks to which new data is to be written to obtain prior data stored in said other blocks of said stripe;

storing said prior data stored in said other blocks of said stripe in stripe storage means;

initiating the writing of said new data to said one or more blocks of said stripe in said RAID array; and if said writing of said new data to said one or more blocks of said stripe is successfully completed, clearing said prior data from said other blocks of said stripe from said stripe storage means; otherwise performing the steps of:

after a failure has occurred, checking said stripe storage means to determine whether said stripe storage means contains any prior data for any stripe;

when said stripe storage means contains prior data for any stripe, performing the steps of:

determining whether said block of said stripe in said RAID array rendered unreadable by said disk failure is one of said data blocks of said stripe in said RAID array for which prior data has been stored in said stripe storage means;

if said block of said stripe in said RAID array rendered unreadable by said disk failure is one of said data blocks of said stripe in said RAID array for which prior data has been stored in said stripe storage means, performing the steps of:

reading data from each remaining readable data block of said stripe in said RAID array other than said data block rendered unreadable by said disk failure;

recomputing a new parity value for said stripe based upon said data read from said each remaining readable data block of said stripe in said RAID array and said prior data stored in said stripe storage means for said data block rendered unreadable by said disk failure; and writing said new parity value for said stripe to a parity block of said stripe in said RAID array.

5. A method for operating a file system that provides protection against corruption of the file system upon writing new data to the file system after a disk failure has rendered unreadable a data block in a stripe of RAID array wherein file system is stored, and that allows recovery of the file system to a consistent state when a system failure occurs prior to all of said new data being successfully written and comprising the steps of:

prior to writing new data to one or more blocks of said stripe, reading all readable blocks of said stripe in said RAID array;

computing data for said unreadable block based upon said readable blocks;

storing said computed data in stripe storage means;

initiating the writing of said new data to said one or more blocks of said stripe in said RAID array; and if said writing of said new data to said one or more blocks of said stripe is successfully completed, clearing said computed data from said stripe storage means; otherwise, performing the steps of:

after said system failure has occurred, checking said stripe storage means to determine whether said stripe storage means contains any computed data for any unreadable data block of any stripe;

when said stripe storage means containing computed data for an unreadable data block of a stripe, performing the steps of:

reading data from each readable data block of said stripe failure in said RAID array other than said data block rendered unreadable by said disk;

recomputing a parity value for said stripe based on said computed data for said unreadable data blocks of said strip stored in said stripe storage means and said data read from said remaining readable data blocks in said stripe in said RAID array; and writing said recomputed parity value for said stripe to a parity block of said stripe in said RAID array.

* * * * *